United States Patent Office 3,073,703
Patented Jan. 15, 1963

3,073,703
BEVERAGE AND METHOD OF MAKING SAME
Lyman D. Dunn, Chicago, Ill., assignor to Leigh R. Gignilliat III, Hinsdale; Robert G. McDonald, Jr., Chicago; and James R. Sweeney, Deerfield, all of Illinois
No Drawing. Filed May 29, 1959, Ser. No. 816,711
18 Claims. (Cl. 99—192)

This invention relates to beverages and more particularly to a pleasant and refreshing partially frozen non-carbonated beverage.

In recent years a partially frozen beverage or drink has been gaining in popularity and acceptance. This beverage is generally sold at roadside stands. In general, it is a partially frozen non-carbonated fruit flavored drink containing fruit flavoring, sugar, fruit acid or citric acid and water. In its partially frozen state it contains generally about 40% ice crystals and about 60% liquid.

An important attribute of this drink and the one that has contributed greatly to its popularity and acceptance is the presence of the ice crystals. Thus in the warm summer climates of our country such a drink is particularly refreshing and desirable. However, this important property is minimized and even eliminated when the ice crystal size is either too small or too large. When the ice crystals are the proper size, the consumer can easily crush the crystals between his teeth with little or no undesirable chilling effect. However, when they are too large, this is not possible. On the other hand, when they are too small, the resultant beverage is more like a mush, is too cold and does not pour correctly, which again does not satisfy the consumer.

In the past it has been customary to prepare such a partially frozen beverage by freezing it in metal or plastic pails in a refrigerated cabinet kept at about 0° F. Others have attempted to prepare the beverage in a shake freezer, soft serve type, or ice cream type machine such as those in popular use in Dairy Queen stands and the like. However, both of these methods of preparing the drink have certain attendant disadvantages. Thus, when the drink is prepared in a pail it has been necessary to stir the solution every 15 to 20 minutes after it starts freezing to keep the ice crystals at a small size and to prevent the formation of needle-like crystals and a hard ice core around the inside of the pail. However, even when this is done, the crystals of ice tend to be large and coarse and generally they are hard to crush between the teeth.

Further, when the beverage is frozen in a soft serve or ice cream machine, the result is nowhere near as acceptable taste-wise because the ice crystals are too fine and tend to aggregate in clumps. The fineness of the crystals results because they are shaved off the refrigerated surface of the machine by a sharp blade thus accounting for the small particle size.

More recently a machine designed for producing the beverage described above has been developed. However, even this machine does not solve the problem of ice crystal size since the resultant ice particles are still grown too large. They also tend to aggregate into ice chunks which clog the delivery spigot of the machine. In this type of freezer, the agitator is in a vertical type freezing cylinder and turns more slowly than the soft serve or ice cream machine and it plows or knocks off the ice crystals formed on and extending out from the refrigerated surface. The clearance between the agitator blade and the wall of the refrigerated compartment is approximately one-eighth of an inch and thus no shaving action is provided.

A means for controlling the ice crystals, however, to obtain a predetermined desirable size, can be had by the addition of a small amount of hydrophilic colloid to the beverage prior to freezing. The presence of this compound will provide adequate particle size control when the solution is properly agitated in the freezer. However, the solution to the ice particle size control problem has provided a further undesirable effect which also must be controlled.

This further undesirable effect is the presence in the beverage of small dispersed gelatinous masses, generally known as fisheyes. These apparently occur when the hydrophilic colloids, among which are various edible water soluble gums, are added to a beverage containing an edible food grade acid. Examples of the edible acids are the food grade fruit acids such as citric, malic, tartaric, fumaric and gluconic; lactic and phosphoric. This problem is also accentuated since many of the modern flavors and clouding agents and oils are gum entrapped so that they also tend to form fisheyes. These are made by dissolving the flavor or clouding agents in, for example, gelatin and then drying the solution. The result is an entrapped flavor or clouding agent. An example of a clouding agent is orange oil brominated to the proper density.

It is, however, possible to provide adequate ice crystal size control using the colloids or gums previously described and while at the same time eliminating the presence of the undesirable fisheyes. This is done by first forming a dry mixture of the colloid or gum, flavor and sugar. This dry mixture is then dissolved in a sufficient amount of water to provide a satisfactory beverage, after which the food grade acid, preferably citric acid is dissolved in the beverage. When this procedure is followed, there will be no fisheyes present in the resultant beverage. Of course, there will be no fisheye problem if the citric acid is eliminated.

It is, therefore, an object of this invention to provide a beverage having a controlled ice crystal size and to prevent agglomeration of the ice crystals during the freezing and dispensing of the beverage.

It is a further object of this invention to provide a pleasant and refreshing partially frozen non-carbonated beverage including by weight about 40% ice crystals of a predetermined and controlled size and about 60% liquid at a serving temperature of between about 28 to 30° F. which comprises an aqueous solution of a fruit flavoring, sugar and food grade acid, and from about .03 to .12% by weight of the solution of a tasteless and odorless hydrophilic colloid.

It is a yet further object of this invention to provide a method for producing such a beverage including the steps of preparing a dry powdered mixture of flavoring, sugar and a tasteless and odorless hydrophilic colloid, dissolving the dry mixture in a suitable amount of water, dissolving an amount of dry powdered citric acid in the solution and thereafter cooling the solution while agitating for a time and at a temperature necessary to provide ice crystals.

Other objects and advantages of the invention will become apparent from the following description.

As previously stated, the frozen beverage of this invention contains a fruit flavoring, sugar, a hydrophilic colloid and food grade acid in a water solution. The fruit flavoring and sugar may be any of those which are commonly in use in the preparation of food products, with each being present in a sufficient amount to provide the desired flavor and sweetness. For example, in the fruit drink of this invention, from about 12 to 15% by weight of the entire solution of sugar provides a satisfactory drink.

In like manner a small amount of food grade acid or citric acid may be included in the composition. This is generally included in an amount from about .2 to .25% by weight of the entire composition.

The beverage is prepared by placing it in a freezing compartment for a period of time long enough to generate the ice crystals. For example, a pail containing 5 gallons of the prepared solution may be frozen to the desired consistency in a 0° F. refrigerated compartment in from 6 to 8 hours. These temperatures and times may be varied radically depending upon the equipment available so long as the desired result is obtained.

In order to control the ice crystal particle size, a small amount of the hydrophilic colloid is included in the solution. Among these hydrophilic colloids are various edible water soluble gums which have the ability in solution to prevent the ice crystals from growing too large, and preventing the ice crystals when formed from aggregating into solid chunks at the temperature at which the product is generally served, which is between about 28 to 30° F. Among the various edible gums which provide the desired control are gum arabic and carrageenin. Other compounds which are suitable are gelatin, guar, jaguar, gum tragacanth, locust bean gum and pectin, and the alginates, both sodium and propylene glycol. Edible water soluble cellulose gums such as sodium carboxymethylcellulose may also be used. Of all of these compounds, all of which can be had in dry powdered form, sodium carboxymethylcellulose is the most desirable for the purpose of this invention.

The carboxymethylcellulose is manufactured by a process which essentially involves water solubilization of a cellulose carefully selected and treated for high purity. The cellulose is first treated with alkali and then is reacted with sodium monochloroacetate as follows:

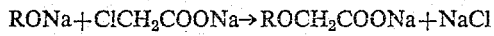

$$RONa + ClCH_2COONa \rightarrow ROCH_2COONa + NaCl$$

where "R" represents the cellulose structure.

Since each anhydroglucose unit in the cellulose structure contains three reactive hydroxyl groups with which the sodium monochloroacetate can react, theoretically complete reaction would mean the introduction of three sodium carboxymethyl groups per anhydroglucose unit. Such a completely reacted product would have a substitution of 3.0. The carboxymethylcellulose which is desirable for the purpose of this invention has a viscosity in a 1% aqueous concentration at 25° C. of from about 100 to 2800 centipoises and a degree of substitution of from about 0.65 to 1.60. The most preferred sodium carboxymethylcellulose has a viscosity in a 1% aqueous concentration at 25° C. of from about 1000 to 2800 centipoises and a degree of substitution from about 0.65 to 0.95.

In adding the hydrophilic colloids or edible water soluble gums to the beverage solution of this invention, favorable results will occur if the dry powder is added in an amount from about .03 to .12% by weight of the entire solution. However, the most favorable results have been achieved when the concentration of the colloids is about .06% by weight of the solution.

As previously explained, in order to avoid the undesirable fisheyes which result when using the colloids and gums as well as the gum entrapped flavors and clouding oils, in a beverage containing citric acid, it is necessary to prepare a solution containing the sugar, flavor, clouding oil and colloid or gum. Once this solution is prepared, the food grade acid is then added. By producing the beverage solution in this manner, the presence of the fisheyes will be substantially avoided. Once the solution is prepared it may then be placed in a suitable freezer to produce the desired amount of ice crystals. Normally, the food grade acid will be included in the beverage solution in a concentration from about .2 to .25% by weight of the solution.

Fisheyes may be substantially avoided also if the food grade acid powder is pressed into tablets which are coated with or contain an edible binder which will delay the solubility of the acid until the gum has dissolved. In this case all of the dry ingredients are mixed together before being added to water. The time required for a 10 gram acid tablet to dissolve is about 10 minutes.

In one example of making the beverage solution of this invention, a dry powder was first compounded which contained 9¾ pounds of cane or beet sugar, .03 pound of entrapped orange oil flavor, .02 pound of entrapped orange oil brominated to the proper density, .005 pound of egg shade color and .045 pound of sodium carboxymethylcellulose having a viscosity in centipoises at 25° C. and in a 1% aqueous concentration of 1000 to 2800 and a degree of substitution of 0.65 to 0.95.

Next, 3.985 pounds of this dry mixture was added to 2¾ gallons of potable water to produce about 3 total gallons of solution. At this point, .015 pound of citric acid were added to the solution. The 3 gallons of finished beverage were then placed in a plastic pail in a refrigerating compartment and maintained there at a temperature of 0° F. for about 6 hours, during which it was stirred at intervals of about 10 minutes. Upon removal, a satisfactory beverage was provided having the desired predetermined ice crystal size. Further, the ice crystals were relatively soft and easily crushed between the teeth, and the over-all beverage had a pleasant taste and desirable mouth feel.

The colloids or edible water soluble gums described in this invention have also been used in beverage solutions containing no food grade acid with satisfactory results insofar as ice crystal size control is concerned. Of course, when the citric acid is absent, the problem of the fisheyes will not be apparent and there is no need for separate compounding of the ingredients in making the beverage solution.

Having described my invention as related to the embodiment set out herein, it is my intention that the invention be not limited by any of the details of description, unless otherwise specified, but rather be construed broadly within its spirit and scope as set out in the accompanying claims.

I claim:

1. A pleasant and refreshing partially frozen non-carbonated beverage comprising by weight about 40% of substantially non-agglomerating ice crystals of a predetermined and controlled size and about 60% liquid at a serving temperature of between about 28 to 30° F., said beverage having been produced from an aqueous solution of a fruit flavoring, from about 12 to 15% of sugar, and from about .03 to .12% of sodium carboxymethylcellulose having a viscosity in a 1% concentration and at 25° C. of from about 100 to 2800 centipoises and a degree of substitution of from about 0.65 to 1.60, said percentages being by weight of said solution.

2. The beverage of claim 1 wherein said sodium carboxymethylcellulose is present in an amount of about .06% by weight of said solution.

3. In a method for producing a pleasant and refreshing partially frozen non-carbonated beverage including by weight about 40% of substantially non-agglomerating ice crystals of a predetermined and controlled size and about 60% liquid at a serving temperature of between about 28 to 30° F., said beverage being free of undesirable small dispersed gelatinous masses; the steps of: preparing a dry powdered mixture of flavor, sugar, a tasteless and odorless hydrophilic colloid and an amount of dry food grade acid having a delayed solubility, dissolving said mixture of flavor, sugar and colloid in a suitable amount of water, thereafter dissolving said amount of dry acid in said solution, and thereafter cooling said solution while agitating for a time and at a temperature necessary to provide said ice crystals, the amount of said colloid present being from about .03–.12% and the amount of said sugar being from about 12 to 15%, all said percentages being by weight of said solution and the amount of said acid being from about .2 to .25% of said solution.

4. In a method for producing a pleasant and refreshing partially frozen non-carbonated beverage including by weight about 40% of substantially non-agglomerating ice crystals of a predetermined and controlled size and about 60% liquid at a serving temperature of between about 28 to 30° F., said beverage being free of undesirable small dispersed gelatinous masses; the steps of: preparing a dry powdered mixture of flavor, sugar and a tasteless and odorless hydrophilic colloid, dissolving said dry mixture in a suitable amount of water, dissolving an amount of dry powdered edible food grade acid in said solution, and thereafter cooling said solution while agitating for a time and at a temperature necessary to provide said ice crystals, the amount of said colloid present being from about .03–.12%, the amount of said acid being from about .2 to .25% and the amount of said sugar being from about 12 to 15%, all said percentages being by weight of said solution.

5. The method of claim 4 wherein said colloid is a member of the class consisting of gum arabic, carrageenin, gelatin, guar, jaguar, gum tragacanth, locust bean gum, pectin, sodium alginate, propylene glycol alginate and carboxymethylcellulose and said acid is a member of the class consisting of citric, malic, tartaric, fumaric, gluconic, lactic and phosphoric.

6. The method of claim 4 wherein said colloid is sodium carboxymethylcellulose having a viscosity in a 1% concentration and at 25° C. of from about 100 to 2800 centipoises and a degree of substitution of from about 0.65 to 1.60, and said acid is citric acid.

7. The method of claim 4 wherein said colloid is sodium carboxymethylcellulose having a viscosity in a 1% concentration and at 25° C. of from about 1000 to 2800 centipoises and a degree of substitution of from about 0.65 to 0.95, and said acid is citric acid.

8. The method of claim 7 wherein said sodium carboxymethylcellulose is present in an amount of about .06% by weight of said solution.

9. A base adapted to be combined in aqueous solution to provide a pleasant and refreshing partially frozen non-carbonated beverage including by weight about 40% of substantially non-agglomerating ice crystals of a predetermined and controlled size and about 60% liquid at a serving temperature of between about 28 to 30° F. comprising: a mixture of fruit flavoring and sugar, and from about .03 to .12% by weight of said aqueous solution of a tasteless and odorless hydrophilic colloid.

10. The base of claim 9 which includes from about .2 to .25% by weight of said solution edible food grade acid chosen from the class consisting of citric, maleic, tartaric, fumaric, gluconic, lactic and phosphoric, and wherein said sugar is present in an amount of from about 12 to 15% by weight of said solution.

11. A base adapted to be combined in aqueous solution to provide a pleasant and refreshing partially frozen non-carbonated beverage including by weight about 40% of substantially non-agglomerating ice crystals of a predetermined and controlled size and about 60% liquid at a serving temperature of between about 28 to 30° F. comprising: a mixture of fruit flavoring, from about 12 to 15% of sugar, and from about .03 to .12% of a member of the class consisting of gum arabic, carrageenin, gelatin, guar, jaguar, gum tragacanth, locust bean gum, pectin, sodium alginate, propylene glycol alginate and carboxymethylcellulose, said percentages being by weight of said solution.

12. The base of claim 11 wherein said member of said class is present in an amount of about .06% by weight of said aqueous solution.

13. A base adapted to be combined in aqueous solution to provide a pleasant and refreshing partially frozen non-carbonated beverage including by weight about 40% of substantially non-agglomerating ice crystals of a predetermined and controlled size and about 60% liquid at a serving temperature of between about 28 to 30° F. comprising: a mixture of fruit flavoring, from about 12 to 15% of sugar, and from about .03 to .12% of sodium carboxymethylcellulose having a viscosity in a 1% concentration and at 25° C. of from about 1000 to 2800 centipoises and a degree of substitution of from about 0.65 to 1.60, said percentages being by weight of said solution.

14. The base of claim 13 wherein said carboxymethylcellulose is present in an amount of about .06% by weight of said aqueous solution.

15. A base adapted to be combined in aqueous solution to provide a pleasant and refreshing partially frozen non-carbonated beverage including by weight about 40% of substantially non-agglomerating ice crystals of a predetermined and controlled size and about 60% liquid at a serving temperature of between about 28 to 30° F. comprising: a mixture of fruit flavoring, from about 12 to 15% sugar, and from about .03 to .12% of sodium carboxymethylcellulose having a viscosity in a 1% concentration and at 25° C. of from about 1000 to 2800 centipoises and a degree of substitution of from about 0.65 to 0.95, said percentages being by weight of said solution.

16. The base of claim 15 wherein said carboxymethylcellulose is present in an amount of about .06% by weight of said aqueous solution.

17. The base of claim 16 including from about .2 to .25% by weight of said solution of citric acid.

18. The base of claim 11 including from about .2 to .25% of a food grade acid having a delayed solubility, said acid being a member of the class consisting of citric, malic, tartaric, fumaric, gluconic, lactic and phosphoric.

References Cited in the file of this patent

UNITED STATES PATENTS

| | | |
|---|---|---|
| 1,505,448 | Van Sant | Aug. 19, 1924 |
| 1,639,122 | Whitman | Aug. 16, 1927 |
| 2,494,912 | Steiner et al. | Jan. 17, 1950 |
| 2,548,865 | Burt | Apr. 17, 1951 |
| 2,588,308 | Tressler | Mar. 4, 1952 |
| 2,823,129 | Steinitz | Feb. 11, 1958 |
| 2,856,289 | Weinstein | Oct. 14, 1958 |
| 2,863,776 | Lisher | Dec. 9, 1958 |
| 2,865,756 | Merory | Dec. 23, 1958 |
| 2,868,646 | Schapiro | Jan. 13, 1959 |